United States Patent
Li et al.

(10) Patent No.: US 11,328,012 B2
(45) Date of Patent: May 10, 2022

(54) VISUALIZATION OF DYNAMIC RELATIONSHIPS IN A STORYLINE

(71) Applicant: International Business Machines Corporation, Armonk, NY (US)

(72) Inventors: Shi Kun Li, Shanghai (CN); Jun Qian Zhou, Shanghai (CN); Ying Li, Shanghai (CN); Yin Qian, Shanghai (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 828 days.

(21) Appl. No.: 16/207,400

(22) Filed: Dec. 3, 2018

(65) Prior Publication Data

US 2020/0175066 A1 Jun. 4, 2020

(51) Int. Cl.
G06F 16/73 (2019.01)
G06F 16/738 (2019.01)
G06T 7/13 (2017.01)
G06F 16/28 (2019.01)
G06F 16/901 (2019.01)
G06V 20/40 (2022.01)

(52) U.S. Cl.
CPC .......... *G06F 16/738* (2019.01); *G06F 16/288* (2019.01); *G06F 16/9024* (2019.01); *G06T 7/13* (2017.01); *G06V 20/49* (2022.01)

(58) Field of Classification Search
None
See application file for complete search history.

(56) References Cited

U.S. PATENT DOCUMENTS

| | | | |
|---|---|---|---|
| 7,509,581 B1 | 3/2009 | Song et al. | |
| 9,237,297 B1 | 1/2016 | Waddell et al. | |
| 9,756,392 B2 | 9/2017 | Silverman | |
| 10,417,271 B2* | 9/2019 | Chang | G06F 16/36 |
| 2008/0080743 A1* | 4/2008 | Schneiderman | G08B 13/196 382/118 |
| 2009/0063157 A1 | 3/2009 | Seo | |
| 2013/0110885 A1 | 5/2013 | Brundrett | |
| 2015/0347597 A1 | 12/2015 | Kim et al. | |
| 2016/0117311 A1 | 4/2016 | Maetz et al. | |
| 2019/0304157 A1* | 10/2019 | Amer | G06V 20/41 |

* cited by examiner

*Primary Examiner* — Craig C Dorais
(74) *Attorney, Agent, or Firm* — Cantor Colburn LLP; Teddi Maranzano

(57) ABSTRACT

A computer-implemented method includes determining that a first time point in a video has been reached during playback of the video. A dynamic relationship graph is displayed in association with the first time point, where the dynamic relationship graph illustrates one or more relationships among two or more characters in the video, responsive to the first time point being reached. The relationship graph includes two or more nodes and one or more edges. The nodes include a respective node representing each character of the two or more characters in the video, and the edges include a respective edge representing each relationship of the one or more relationships among the characters. It is determined that a second time point is reached in the video. The dynamic relationship graph is updated to represent a change in the one or more relationships between the first time point and the second time point.

18 Claims, 7 Drawing Sheets

VISUALIZATION OF DYNAMIC RELATIONSHIPS IN A STORYLINE

BACKGROUND

The present invention relates to video playback and, more specifically, to visualization of dynamic relationships in a storyline.

Currently, videos are available for viewing by various means. For instance, a video can be stored on a hard drive, DVD disc, or Blu-ray disc for a user to watch locally. Alternatively, a video can be stored remotely, such as in a cloud, and can be streamed to a user's computing device. Streaming services greatly expand the content available to a user by making videos available on demand. As video streaming has increased in popularity, there are numerous sources for users to watch videos, including movies, short films, television shows, and homemade clips.

SUMMARY

Embodiments of the present invention are directed to a computer-implemented method for visualizing a relationship depicted in a video. A non-limiting example of the computer-implemented method includes determining that a first time point in a video has been reached during playback of the video. A dynamic relationship graph is displayed in association with the first time point, where the dynamic relationship graph illustrates one or more relationships among two or more characters in the video, responsive to the first time point being reached. The relationship graph includes two or more nodes and one or more edges. The two or more nodes include a respective node representing each character of the two or more characters in the video, and the one or more edges include a respective edge representing each relationship of the one or more relationships among the two or more characters. It is determined that a second time point is reached in the video. The dynamic relationship graph is updated to represent a change in the one or more relationships between the first time point and the second time point.

Embodiments of the present invention are directed to a system for visualizing a relationship depicted in a video. A non-limiting example of the system includes a memory having computer-readable instructions and one or more processors for executing the computer-readable instructions. The computer-readable instructions include determining that a first time point in a video has been reached during playback of the video. Further according to the computer-readable instructions, a dynamic relationship graph is displayed in association with the first time point, where the dynamic relationship graph illustrates one or more relationships among two or more characters in the video, responsive to the first time point being reached. The relationship graph includes two or more nodes and one or more edges. The two or more nodes include a respective node representing each character of the two or more characters in the video, and the one or more edges include a respective edge representing each relationship of the one or more relationships among the two or more characters. It is determined that a second time point is reached in the video. The dynamic relationship graph is updated to represent a change in the one or more relationships between the first time point and the second time point.

Embodiments of the invention are directed to a computer-program product for visualizing a relationship depicted in a video, the computer-program product including a computer-readable storage medium having program instructions embodied therewith. The program instructions are executable by a processor to cause the processor to perform a method. A non-limiting example of the method includes determining that a first time point in a video has been reached during playback of the video. Further according to the method, a dynamic relationship graph is displayed in association with the first time point, where the dynamic relationship graph illustrates one or more relationships among two or more characters in the video, responsive to the first time point being reached. The relationship graph includes two or more nodes and one or more edges. The two or more nodes include a respective node representing each character of the two or more characters in the video, and the one or more edges include a respective edge representing each relationship of the one or more relationships among the two or more characters. It is determined that a second time point is reached in the video. The dynamic relationship graph is updated to represent a change in the one or more relationships between the first time point and the second time point.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
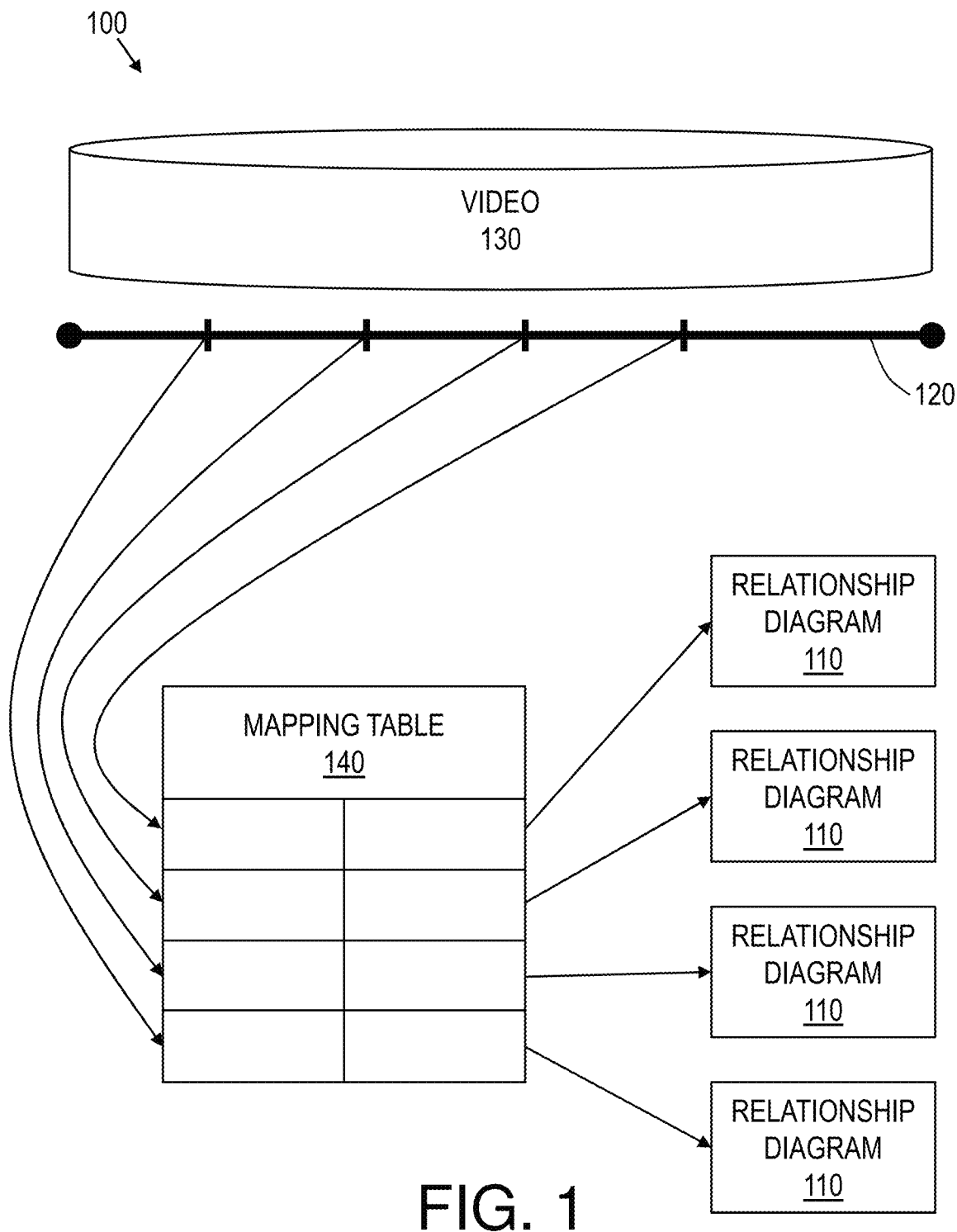
FIG. 1 is a diagram of a visualization system for providing visualizations of dynamic relationships in a storyline, according to some embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, video storylines can be span minutes or hours. For instance, in the case of a long-term television series that spans multiple seasons, a storyline can unfold over hundreds of hours. The emotions of characters and relationships among characters can change over that time. In many cases, it can be difficult to recall the current relationship between characters at a given moment in a video. This problem is especially apparent in the case of long-term series, in which months can pass without a new episode in the off-season. Occasionally, series producers release summaries, or refreshers, of previous seasons before a new season is released, but even these summaries do not cover all the relationships in the series.

Turning now to an overview of the aspects of the invention, one or more embodiments of the invention address the above-described shortcomings of the prior art by providing one or more relationship diagrams that express dynamic relationships among the characters. In some embodiments of the invention, a dynamic relationship diagram is associated with the video. Specifically, each portion (e.g., each frame, each scene) of the video is associated with a version, or state, of the relationship diagram, which can change as relationships change in the storyline over the course of the video. For example, and not by way of limitation, a relationship diagram includes a node for each character, or for each of a subset of characters. The edges between these nodes may represent relationships between pairs of characters, and a weight, color, and description associated with an edge may describe the nature of the corresponding relationship. As the video plays, or as the user interacts with a timeline of the video, the relationship diagram may change to reflect the changing relationships.

The above-described aspects of the invention address the shortcomings of the prior art by providing a mechanism to allow users to view the dynamic relationships among characters. Embodiments of the invention enable a user to explore the relationships among characters and, through the use of various types of relationship diagrams and the ability to view relationship diagrams based on a timeline, to customize the manner in which those relationships are presented. As such, users can enjoy videos without worrying about whether they will understand the relationships, which can be essential to storylines.

Turning now to a more detailed description of aspects of the present invention, FIG. 1 is a diagram of a visualization system 100 for providing visualizations of dynamic relationships in a storyline, according to some embodiments of the invention. Generally, the visualization system 100 may present one or more relationship diagrams 110 corresponding to a current point on a timeline 120 of a video 130. The video 130 may be, for example, a clip, a movie, or an episode of a television show. The video 130 may be stored locally or may be provided by way of a streaming service. Analogously, the relationship diagrams 110 provided by the visualization system 100 may be generated or stored, locally or remotely, or a combination of locally and remotely.

In some embodiments of the invention, as described in detail below, a mapping table 140 is used to map points on the timeline 120 (i.e., timestamps) to one or more relationship diagrams 110, or to one or more data structures from which relationship diagrams 110 can be generated, that describe the relationships among characters at such points on the timeline 120. In other words, the relationship diagrams 110 describe the dynamic relationships among characters, which change over time. As will be described in detail below, the visualization system 100 may support various types of relationship diagrams 110, including one or more of the following, for example: a relationship graph, a partial relationship graph, a relationship curve, and an emotion curve. Each of these will be described in detail below. Generally, a relationship diagram 110 illustrates one or more relationships between pairs of characters, or among groups of characters, in a storyline of the video 130.

Figure 2:
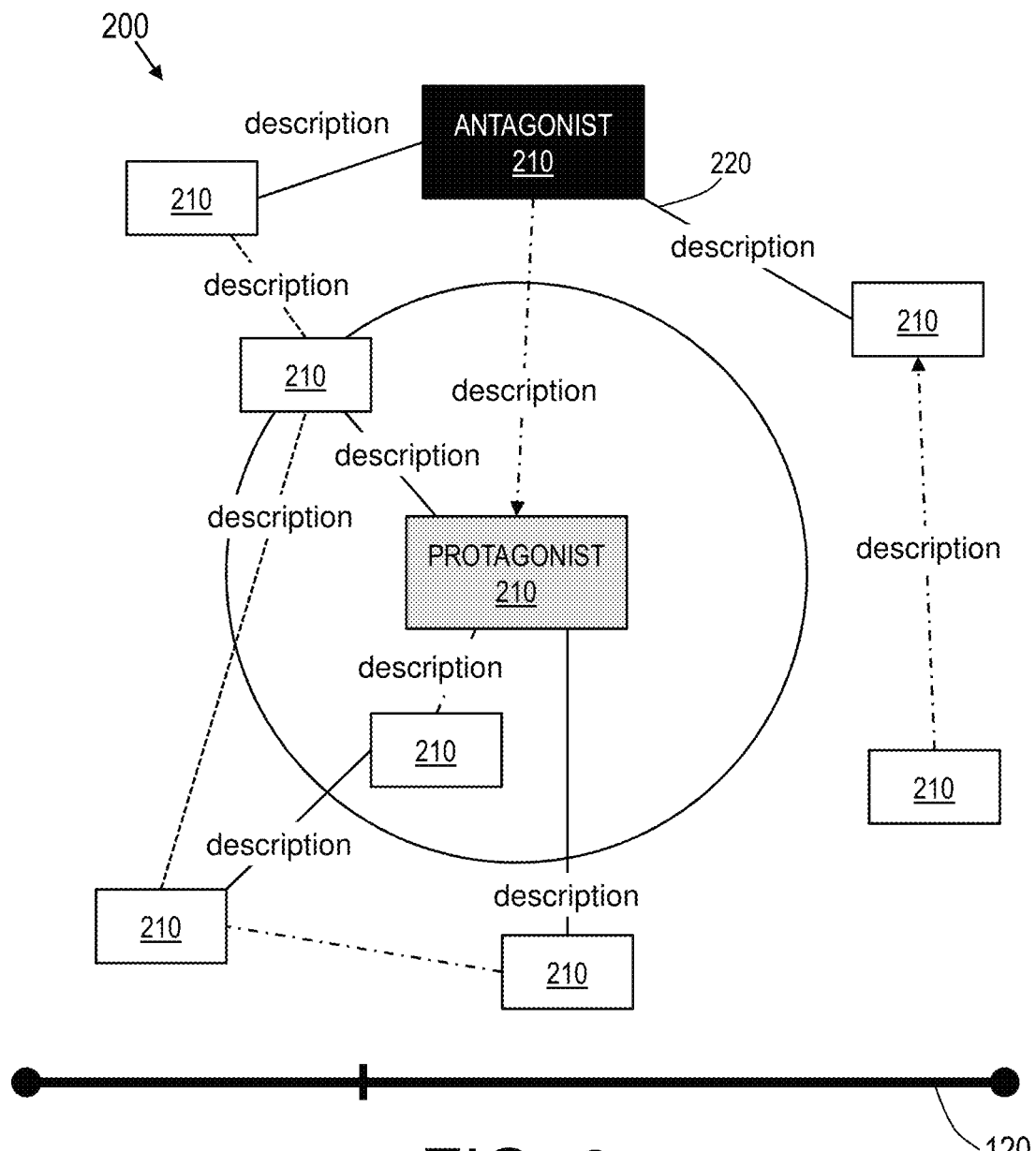
FIG. 2 is an example full relationship graph of the visualization system, according to some embodiments of the invention.

FIG. 2 is an example relationship graph 200, also referred to as a full relationship graph 200, of the visualization system 100 according to some embodiments of the invention. According to some embodiments of the invention, the full relationship graph 200 associated with a given timestamp of a video 130 is a complete graph of relationships known to exist among tracked characters that have been introduced in the video 130 by that timestamp. For instance, a tracked character may be a character who appears in at least one relationship diagram 110 for the video 130. However, it will be understood that the full relationship graph 200 need not include every single relationship of tracked characters, but only those known to the visualization system 100. In contrast, as will be described with reference to FIG. 3 below, a partial relationship graph 200 may include a subset of the characters, and thus a subset of the relationships, shown in the full relationship graph 200. Generally, the full relationship graph 200 may reflect all or a portion of the following information about characters and relationships, for example: existence of characters, importance of characters, which characters are protagonists, which characters are antagonists, existence of relationships, descriptions of relationships, weights of relationships, and sentimentality (e.g., positivity or negativity) of relationships.

In some embodiments of the invention, information about characters and relationships represented in the relationship graph 200, as well as other relationship diagrams 110, may be entered manually or automatically. For instance, the setup of relationship diagrams 110 may be an initialization step that involves manual cooperation and need be performed only once per video 130. However, in some embodiments of the invention, as will described below, relationship diagrams 110 may be formed or edited by users, such that relationship diagrams are crowd-sourced. In this case, each version (i.e., at each timestamp) of each relationship diagram 110 in the visualization system 100 may be represented by one or more data structures, which may be modifiable by users, and where each modification of a data structure may result in one or more modified relationship diagrams 110.

As shown, in some embodiments of the invention, each character in the full relationship graph 200 is represented as a node 210, which may appear as a rectangle. The associated character's name may appear in or proximate each node 210. Alternatively, however, each node 210 could appear as a circle or other shape. Generally, it will be understood by one skilled in the art that the appearance of the relationship graph 200 in FIG. 2 is illustrative and not restrictive. Various objects and shapes, and positions of those objects and shapes, can be used to represent characters and relationships according to some embodiments of the invention. Further, in some embodiments of the invention, characters need not be limited to human beings. Rather, each entity with a relationship represented in a relationship diagram 110 for a video 130 may be considered a character. For example, and not by way of limitation, characters can include settings, organizations, or other entities.

In some embodiments of the invention, the styles or positions of nodes 210 vary based on information about the characters they represent. For example, and not by way of limitation, one or more characters deemed to be the protagonist of the video 130 may appear in the center, or at least proximate the center, of the relationship graph 200. For another example, each character deemed to be an antagonist to a protagonist may be emphasized, such as by that character's respective node 210 being highlighted, shaded, or color- or pattern-coded. Additionally, each other character deemed important may be emphasized, such as by way of having a bold outline or having the character name appearing in bold text. Further, in some embodiments of the invention, important characters may be positioned within a threshold distance from the character deemed to be the protagonist. Further, in some embodiments of the invention, this threshold may be displayed in the relationship graph 200 as a circle surrounding the protagonist, with the radius of the circle being equivalent to the value of the threshold, such that each node 210 representing an important character falls on or within the circle. In some embodiments of the invention, the importance of characters or other categorization of characters is among the information provided to initialize use of the visualization system 100 for the video 130, or is information provided by users.

In some embodiments of the invention, a relationship between two characters is represented in the relationship graph 200 by an edge 220, or line, between the nodes 210 representing those two characters. Further, if the relationship goes in only one direction, then the edge 220 may be a directed edge 220, or an arrow, pointing from the node 210 of the character who has the relationship to the node 210 of the character with whom the relationship is had. For instance, if a company Company Inc. employs a character John, then an arrow may point from a node 210 labeled "Company Inc." to a node 210 labeled "John" to express this relationship.

Each relationship may be associated with one or more of the following features: a description, a sentimentality, and a weight. The description may describe the relationship. For instance, in the above example of Company Inc. employing John, the description of that relationship may be "employs." In some embodiments of the invention, the description of a relationship is embodied in a string, which appears in the relationship graph 200 in a position proximate the edge 220 representing the relationship. The sentimentality may be an indication of whether the relationship is positive, negative, or neutral. The weight may indicate the strength of the relationship, or the level or positivity or negativity of the relationship. In other words, the weight may be a further characterization of the sentimentality.

In some embodiments of the invention, only positive or negative relationships have weights other than a default value. For example, and not by way of limitation, weight can range from −1 to 1, where a neutral relationship always has a value of 0. Negative relationships may have negative weights, and the absolute value of the weight may indicate how negative that relationship is. Analogously, positive relationships may have positive weights, and the absolute value of the weight may indicate how positive that relationship is, such that a higher weight indicates a more positive relationship. In some embodiments of the invention, the sentimentality of a relationship is indicated by the color of the edge 220 representing the relationship. For example, and not by way of limitation, positive relationships may be represented by green edges 220, neutral relationships may be represented by yellow edges 220, and negative relationships may be represented by red edges 220. Although no color is explicitly included in FIG. 2 and FIG. 3, a variation of dashed and solid lines is used to represent a variation in color. Additionally or alternatively, in some embodiments of the invention, the weight of a relationship is represented by the thickness of the edge 220, such that the thickness, or boldness, is based on the weight. For example, and not by way of limitation, the width of a line may be a standard or default width, increased by the absolute value of the weight of the relationship represented.

It will be understood, however, that the description above is exemplary only and that characters and the relationships among them may be reflected in other ways in full relationship graphs 200 or other relationship diagrams 110.

In some embodiments of the invention, a relationship diagram 110 is dynamic and changes over the course of the video 130. More specifically, across various points on a timeline 120 of the video 130, a relationship diagram 110 may vary. For example, and not by way of limitation, the relationship diagram 110 may vary from one scene to the next, such that changes in the relationship diagram 110 occur between scenes or during scenes.

In some embodiments of the invention, the visualization system 100 may define change points, which may be timestamps on the timeline 120 at which relationship diagrams 110 are allowed to change. For instance, it may be computationally expensive to allow relationship diagrams 110 to change at every second on the timeline 120, even though a relationship in a video 130 may actually change at any moment. Thus, the visualization system 100 may establish a set of change points, which may vary across videos 130, to limit the frequency with which relationship diagrams 110 can change. For example, and not by way of limitation, a change point may be established at the end of each scene, such that relationship diagrams 110 may be updated between scenes. Generally, with a higher resolution of change points, more computational resources may be used to support the generation or storage of relationship diagrams 110, as compared to a lower resolution of change points.

As will be described below, various mechanisms may be used to provide changes in a relationship diagrams 110 over time. For example, and not by way of limitation, each version (i.e., at each change point) of each relationship diagram 110 may be pre-generated and stored, such as in image format, so that the relationship diagram 110 need only be retrieved when the timeline 120 reaches the change point associated with that version of the relationship diagram 110. For another example, each version of the relationship diagram 110 may be represented by a data structure, enabling that version of the relationship diagram 110 to be generated on demand when the change point is reached on the timeline 120. It will be understood by one skilled in the art that frequent changes to a relationship diagram may be more computationally intensive or storage intensive than less frequent changes, and thus there may exist a tradeoff between high-resolution change points and computing resources.

As shown in FIG. 1, some embodiments of the invention include a mapping table 140, which maps points on the timeline 120 of the video 130 to one or more relationship diagrams 110. Generally, each record (e.g., row) of the mapping table 140 maps a change point on the timeline 120 to a set of one or more relationship diagrams 110 or data structures, or combination of both. For example, and not by way of limitation, each column of the mapping table 140 may be associated with a different type of relationship diagram 110 (e.g., full relationship graph 200, partial relationship graph, relationship curve, emotion curve), or a single column may be associated with a set of relationship diagrams 110. Additionally, each column may include actual data, such as an image of the appropriate relationship diagram 110 or a data structure representing the relationship diagram 110, or a pointer to the appropriate relationship diagram 110 or data structure.

It will be understood that various data structures could be used to represent the various relationship diagrams 110 described herein, and the specific data structures described herein are illustrative and not restrictive. For instance, in some embodiments of the invention, each character may be represented by a character structure, which is a first type of data structure, and each relationship may be represented by a relationship structure, which is a second type of data structure. The character structure may include the following, for example: a string indicating a name of the character, a Boolean variable indicating whether the character is a protagonist, a Boolean variable indicating of whether the character is an antagonist, and Boolean variable indicating whether the character is important or a numeric weight indicating a level of importance. The relationship structure may include the following, for example, an indication of a first character (e.g., a string matching the string that is name of the first character, or a pointer to the character structure representing the first character), an indication of a second character, a Boolean variable indicating of whether the relationship is a one-way relationship from the first character to the second character, a string including the description of the relationship, a numeric value indication sentimentality, and a numeric value indicating the weight).

In some embodiments of the invention, there may exist a character structure associated with a video 130 for each tracked character of that video 130. Further, there may exist a relationship structure associated with the video 130 for each tracked relationship of the video 130. In some embodiments of the invention, the mapping table 140 includes pointers to one or more relationships structures or character structures. For instance, for a record representing a first change point, a column of the mapping table 140 may include a pointer to each relationship structure representing a relationship as it exists at that change point. Because relationships change over time, there may exist multiple relationships structures for a given relationship. For the case when a relationship is the same across two or more records (i.e., across change points), there need only be one copy of such as relationship structure, and each corresponding record may point to that relationship structure as applicable.

In some embodiments of the invention, based on these data structures established for the various characters and relationships for a given change point, the visualization system 100 may be able to generate a relationship diagram 110, such as the full relationship graph 200, representing these characters and their relationships. Various techniques exist for generating graphs or networks based on information about nodes 210 and edges 220, and one or more of such techniques may be used by the visualization system 100 to generate a relationship diagram 110 as needed.

As discussed above, embodiments of the invention may support other relationship diagrams 110 in addition to, or alternatively to, the full relationship graph 200. Examples of other relationship diagrams are shown in FIGS. 3, 4A, and 4B, which are described below.

Figure 3:
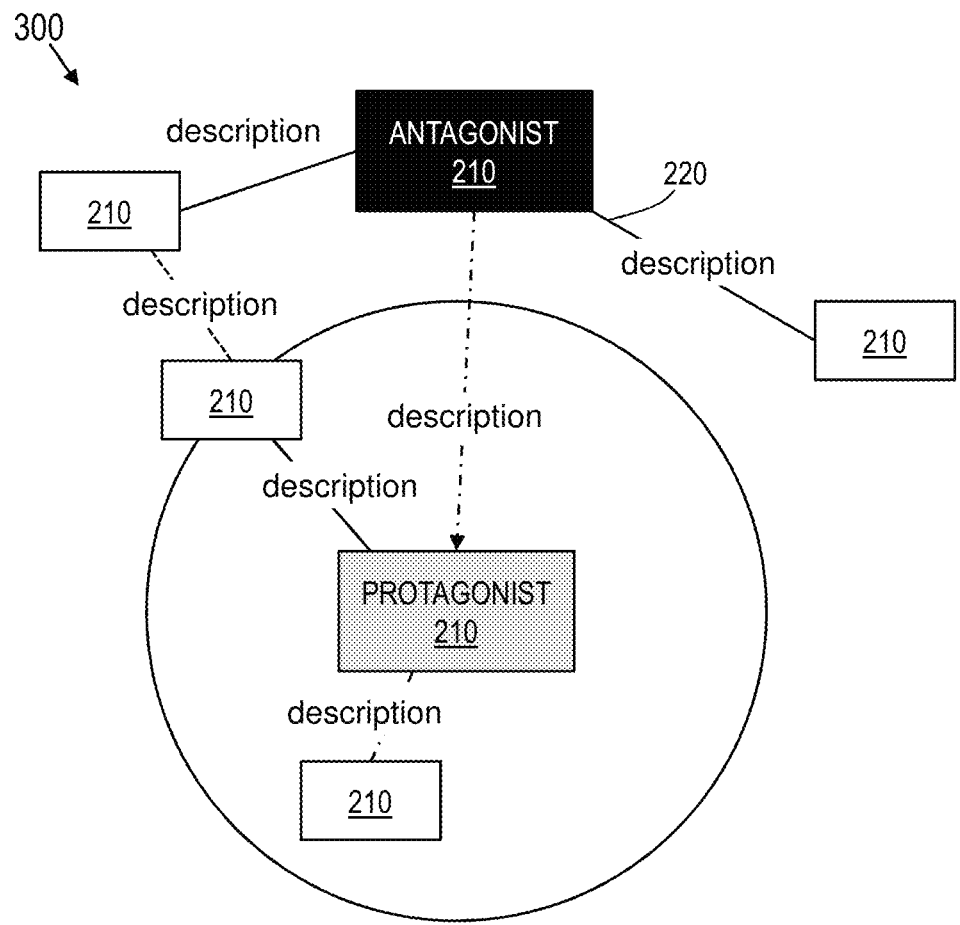
FIG. 3 is an example partial relationship graph of the visualization system, according to some embodiments of the invention.

FIG. 3 is an example partial relationship graph 300, based on the relationship graph 200 of FIG. 2, according to some embodiments of the invention. In some embodiments of the invention, a partial relationship graph 300 for a given time is a subset of the full relationship graph 200 for that same time. Thus, as seen by comparing the partial relationship graph 300 of FIG. 3 to the full relationship graph 200 of FIG. 2, the partial relationship graph 300 is a subset of the full relationship graph 200. More specifically, for instance, the partial relationship graph 300 may include a subset of the nodes 210, representing a subset of the characters, along with all the relationships that include those nodes 210. Further, in some embodiments of the invention, the partial relationship graph 300 is a proper subset of the full relationship graph 200, in that the partial relationship graph 300 excludes one or more character nodes 210.

Generally, the partial relationship graph 300 enables a user to focus on relationships among a subset of the characters, without being distracted by the relationships of other characters. In some embodiments of the invention, a partial relationship graph 300 is especially useful to describe relationships among characters within a select scene or select frame of the video 130. When viewing a portion of the video 130, a user may be most interested in characters appearing in that portion, and thus a partial relationship graph 300 reflecting only those characters may be useful to the user.

Figure 4A:
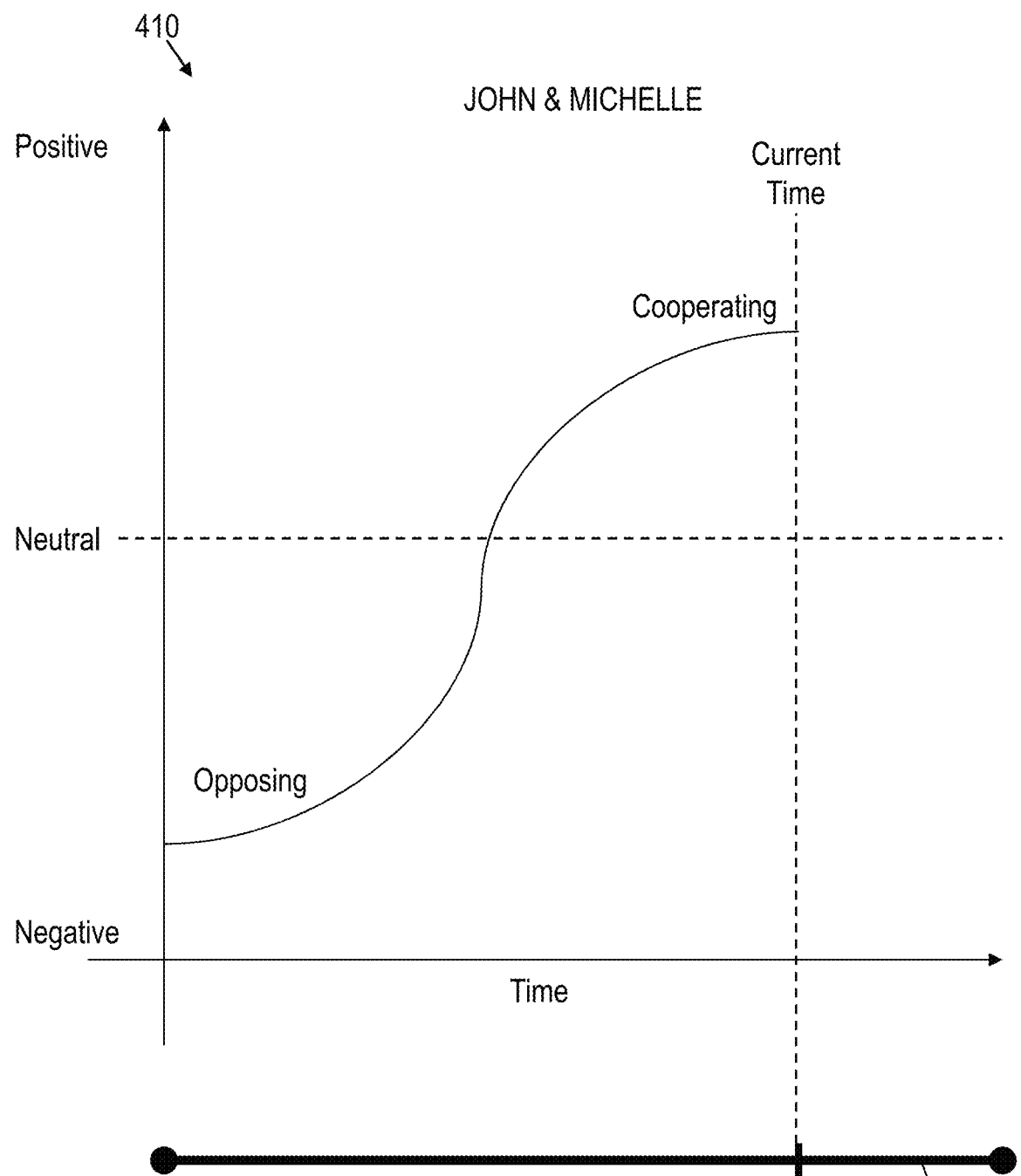
FIG. 4A is an example relationship curve of the visualization system, according to some embodiments of the invention.
Figure 4B:
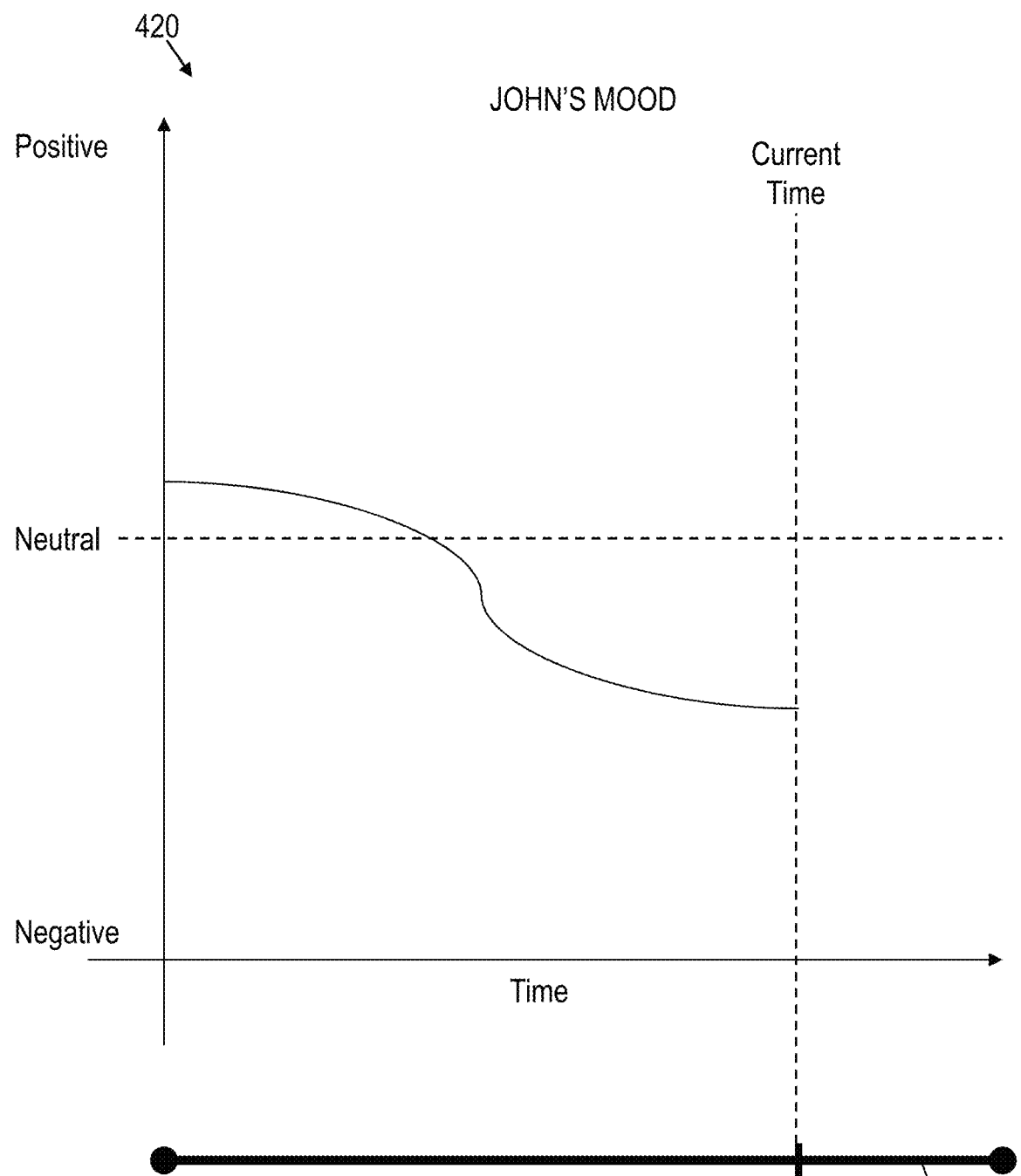
FIG. 4B is an example emotion curve of the visualization system, according to some embodiments of the invention.

FIG. 4A is an example relationship curve 410 of the visualization system, according to some embodiments of the invention. In some embodiments of the invention, each relationship curve 410 reflects a single relationship between characters, such as between two characters. In the example of FIG. 4A, the relationship represented by the relationship curve 410 is between characters John and Michelle, who are opposing at the beginning of the video 130 but are cooperating at the current time in the video 130. As discussed above, a relationship graph 200 can change over time due to changing relationships among characters, and further, each relationship may be associated with a sentimentality and a weight. The relationship curve may reflect the change the sentimentality and weight of the relationship over time.

Unlike the full relationship graph 200 and the partial relationship graph 300, in some embodiments of the invention, the relationship curve 410 reflects a span of time rather than a point in time. For instance, the relationship curve 410 may represent the span from the beginning of the video 130 to the current point on the timeline 120, or to the most recent change point. As shown in FIG. 4A, the relationship curve 410 may have a horizontal axis that represents time, and this horizontal axis may correspond to the timeline of the video 130. The value of the relationship curve 410 at a given time may represent the state of the relationship in question at that time. In some embodiments of the invention, when the relationship is in a neutral state (i.e., has a neutral sentimentality), then the value on the vertical axis may be a default, or neutral value, such as 0 or 50. When the relationship is in a positive state, then the value of the relationship curve 410 may be above this neutral value by an amount that is based on the weight of the relationship, and analogously, then the relationship is in a negative state, then the value of the relationship curve 410 may be below the neutral value by an amount based on the weight of the relationship. Thus, the relationship curve 410 may reflect the changes in positivity and negativity of the relationship up to the current point on the timeline 120. In some embodiments of the invention, the relationship curve 410 is progressive and stops at the current point in the timeline 120 (e.g., the current point where the user is in watching the video 130), so as not to give spoilers about the remainder of the video 130.

FIG. 4B is an example emotion curve 420 of the visualization system, according to some embodiments of the invention. In some embodiments of the invention, the emotion curve 420 reflects the emotions of a single character over time. Thus, in a sense, the emotion curve 420 reflects a character's relationship with himself or herself. In the example of FIG. 4B, the emotion curve 420 reflects the character John's emotions from the beginning of the video 130 until the current time. As in the relationship curve 410, the horizontal axis of the emotion curve 420 may represent time, such as according to the timeline 120 of the video 130. The vertical axis, or the value of the emotion curve 420 at each point in time, may represent the value of the character's mood. The dynamic value of various characters' moods may be stored by the visualization system 100 and may be retrieved for the generation of an emotion curve 420 as needed.

For example, and not by way of limitation, the mapping table 140 may include a respective column for each character for whom an emotion curve 420 is supported. The value in that column for a record of the mapping table 140 may reflect the value of that character's mood, or emotions, at the corresponding point in time of the record. As mentioned above, the provision of these values may be provided manually or automatically, as an initialization operation or through crowd-sourcing, for instance. For another example, each character structure may include an indication of the character's emotions over time. In either case, the information stored to describe the character may be used to generate the emotion curve 420 of that character.

In some embodiments of the invention, one or more relationship curves 410 and emotion curves 420 may be shown together as a single relationship diagram 110. For instance, as described above, both a relationship curve 410 and an emotion curve 420 may represent time on the horizontal axis and mood on the vertical axis. As such, using these axes, multiple relationship curves 410 or emotion curves 420, or a combination of both, may be displayed on a single pair of axes to feature two or more characters or relationships at once.

In some embodiments of the invention, the visualization system 100 is integrated with, or in communication with, a system for playing back one or more videos 130. In that case, the visualization system 100 may display one or more relationship diagrams 110 during playback, or the relationship diagrams 110 may be available for user interactions on the playback system.

For instance, the user may opt to keep one or more relationship diagrams 110 visible during playback. In that case, such relationship diagrams 110 may appear over the video content, for instance, partially transparently. For example, and not by way of limitation, the partial relationship graph 300 may be shown, opaquely or in partial transparency, in a corner of the video 130 or at another position chosen by the user or chosen by visualization system 100 to reduce distraction from the video 130. If the user selects the partial relationship graph 300 during playback, then the video 130 may automatically pause, and the visualization system 100 may display the full relationship graph 200 for the user to explore in more detail.

More generally, if the user selects (e.g., by touching on a touchscreen or by selecting with a cursor) a displayed relationship diagram 110, the visualization system 100 may then enable the user to manipulate the relationship diagram 110, such as by changing the type of relationship diagram 110 or changing the characters that are featured (i.e., shown or represented) in the relationship diagram 110. Upon viewing the full relationship graph 200 or a partial relationship graph 300, the user may select one or more nodes 210 to be included or one or more nodes 210 to be hidden. The nodes 210 to be included may then be shown in a partial relationship graph 300 reflecting only those nodes 210, and corresponding characters, desired to be viewed by the user. Analogously, upon viewing a relationship curve 410 or an emotion curve 420, the user may select which relationships or characters to feature. Responsively, for each selected relationship, the visualization system 100 may display a relationship curve 410 up to a current timestamp, and for each selected individual character, the visualization system 100 may display an emotion curve 420.

As mentioned above, the information displayed in the various relationship diagrams 110 may be crowd-sourced (i.e., provided by users). In some embodiments of the invention, to facilitate the integration of crowd-sourced data, the relationship diagrams 110 may be stored in the visualization system 100 as data structures, rather than as only complete images. However, in some embodiments of the invention, upon generation of a relationship diagram 110 based on one or more such data structures, the resulting image of the relationship diagram 110 may be stored for later use to avoid regeneration until there has been a change to the data structures used a basis for the relationship diagram 110.

When crowd-sourcing is supported, a user may be enabled to modify a relationship diagram 110. For example, and not by way of limitation, the user may add a character or a relationship to a full relationship graph 200 or a partial relationship graph 300, and such an addition may be incorporated into an updated character structure or relationship structure as applicable. For another example, the user may make indications of a character's mood at one or more timestamps, and such indications may be added to the applicable character structure. For another example, the user may modify a relationship at a given time (e.g., by changing the description, weight, or sentimentality), and such a modification may be incorporated into the applicable relationship structure.

If information added by a user contradicts information added by another user, then one or more algorithms may be used to address such a conflict. For example, and not by way of limitation, the user whose past changes have been approved more often by other users may be deemed to have provided correct information over the other user. For another example, the conflict may be managed by an administrator of the visualization system 100 or of the video 130, where that administrator may be tasked with determining which user's information is correct. For another example, the visualization system 100 may implement a majority vote, such that the information submitted by a first set of users is incorporated over information submitted by a second set of users, when the quantity of users in the first set is greater than the quantity of users in the second set. For another example, an administrator of the visualization system 100 or of the video 130 may be required to approve each change made by each user, or made by users who are not authorized to make changes without approval.

Figure 5:
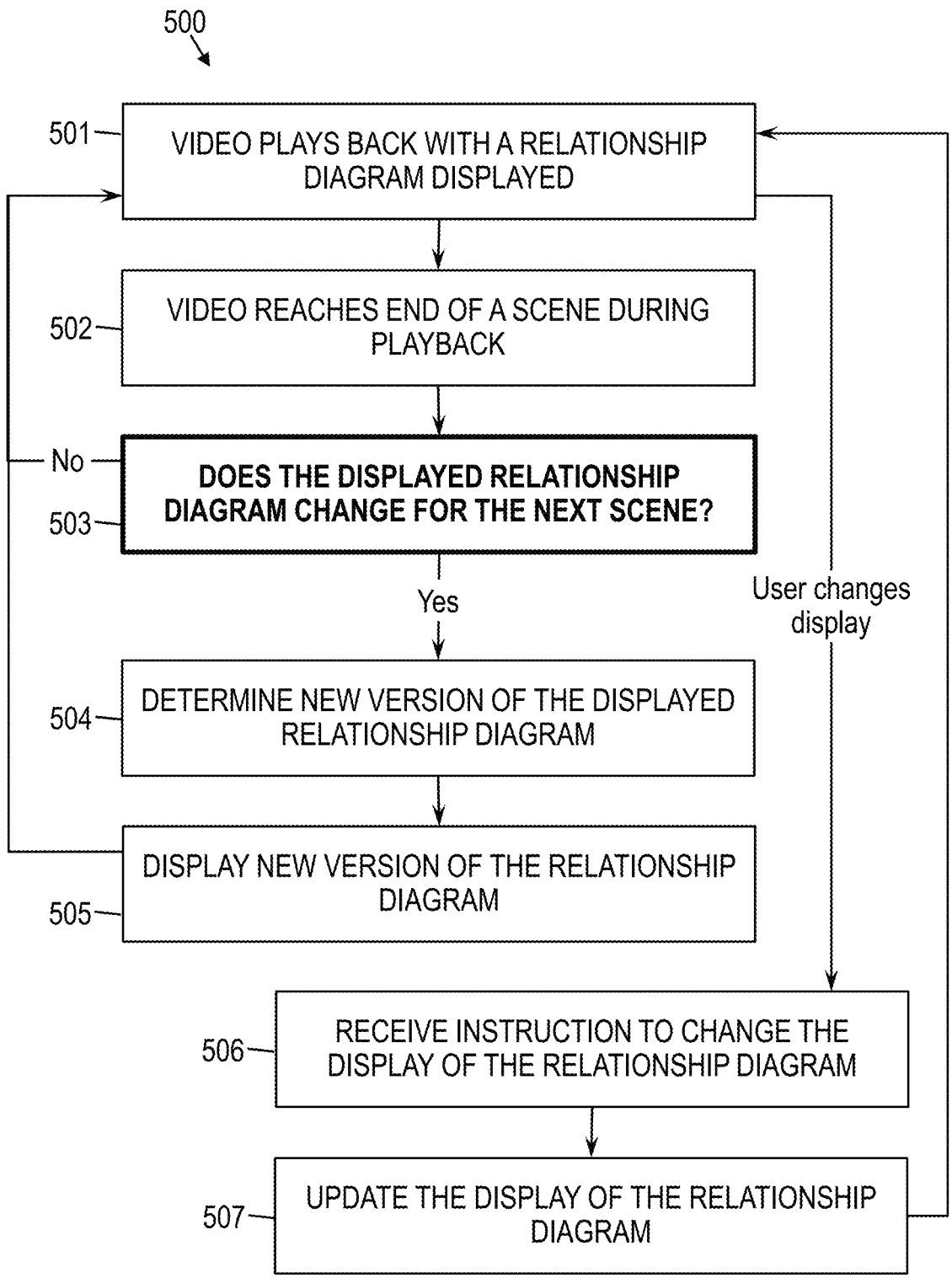
FIG. 5 is a flow diagram of a method for generating and displaying one or more relationship diagrams during playback of a video, according to some embodiments of the invention.

FIG. 5 is a flow diagram of a method 500 for generating and displaying one or more relationship diagrams 110 during playback of a video 130, according to some embodiments of the invention. In this example, the visualization system 100 supports a scene-level resolution of change points. In other words, each relationship diagram 110 can change from scene to scene. Further, in this example, changes occur at the end of each scene, such that the set of relationship diagrams 110 are consistent through a scene but have the potential to change at the end of the scene. It will be understood by one skilled in the art, however, that a higher or lower resolution may be used, and that other change points may be used (e.g., the midpoint of a scene, the beginning of a scene).

At block 501, playback of the video 130 proceeds with a relationship diagram 110 displayed with partial transparency over a portion of the video 130. As described above, in some embodiments of the invention, the display of a relationship diagram 110 during playback is an optional feature. However, for the purposes of this illustrative example, a relationship diagram 110 is displayed.

At block 502, the video 130 reaches the end of a scene, which is a change point. At decision block 503, responsive to reaching the end of the scene, the visualization system 100 may determine whether the currently displayed relationship diagram 110 changes for the next scene. This determination may be made in various ways. For instance, as described above, a mapping table 140 may be used. For each scene, the mapping table 140 may include a record, which may reference (e.g., point to or include) a set of data structures that reflect the tracked characters and relationships as they exist during that scene. In that case, the visualization system 100 may check the mapping table 140 to determine whether, for the next scene, the data structures on which the currently displayed relationship diagram 110 is based differ from the data structures on which the currently displayed relationship diagram 110 for the current scene is based. It will be understood that this does not necessarily require comparing every data structure, as the currently displayed relationship diagram 110 may feature only a subset of relationships and characters, and thus, according to some embodiments of the invention, only the corresponding respective relationship structures and characters structures need be compared across scenes.

If there is no change in the currently displayed relationship diagram 110, then the method 500 returns to block 501, where playback continues.

However, if the relationship diagram 110 changes, then at block 504, a new version of the relationship diagram 110 is determined. For instance, the new version may be generated based on the data structures applicable to the next scene (e.g., the data structures referenced by the next record of the mapping table 140).

At block 505, as the next scene begins, the new version of the relationship diagram 110 is displayed on the video 130, and the method 500 returns to block 501, where playback proceeds.

Occasionally, the user may request to change which relationship diagram 110 is displayed. This change may be, for instance, a selection of a different relationship diagram 110 or a selection of which characters or relationships to be featured in the relationship diagram 110. Thus, at block 506, during playback, the visualization system 100 may receive an instruction to change the relationship diagram 110. At block 507, the visualization system 100 updates the relationship diagram 110 displayed according to the user's selections. The method 500 then returns to block 501 for continued playback of the video 130.

Figure 6:
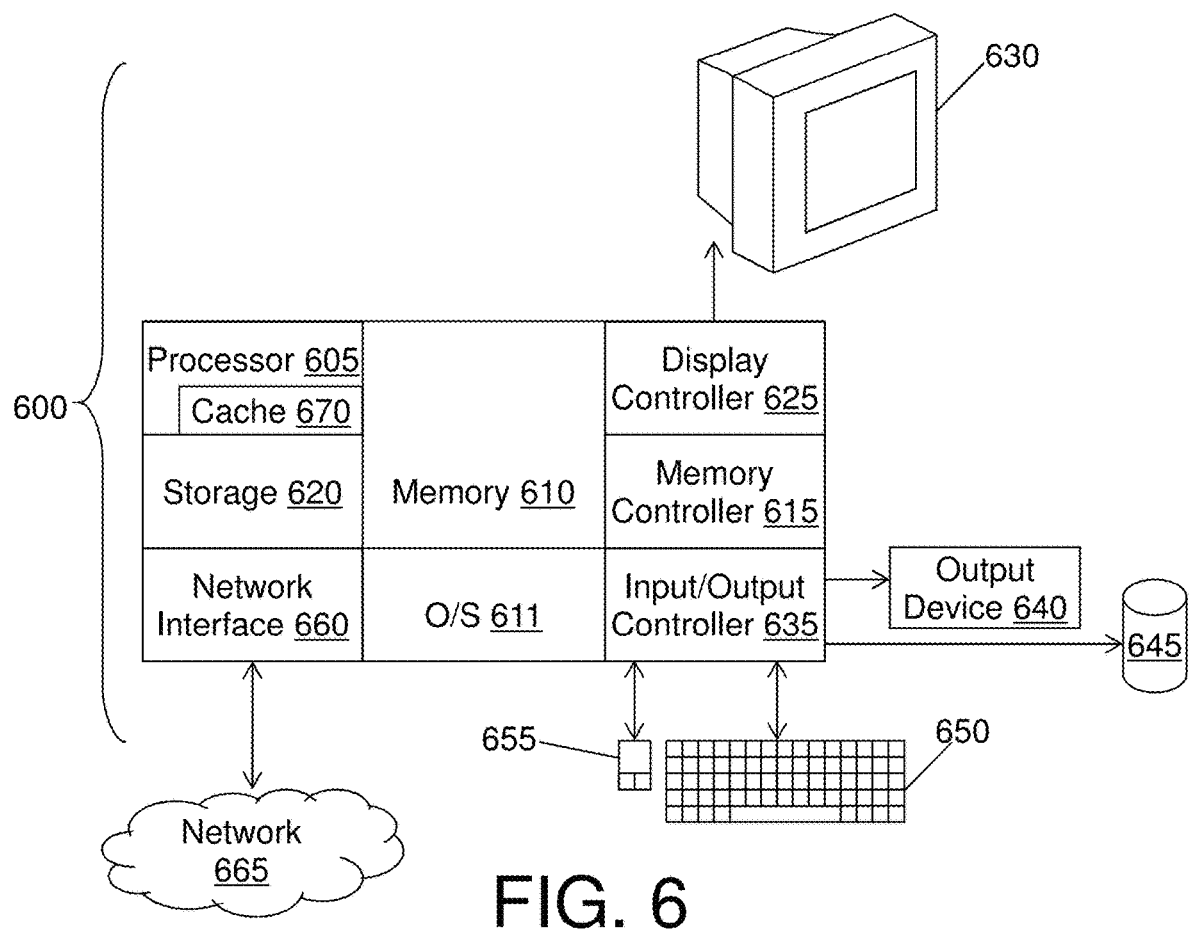
FIG. 6 is a block diagram of a computer system for implementing some or all aspects of the visualization system, according to some embodiments of this invention.

FIG. 6 is a block diagram of a computer system 600 for implementing some or all aspects of the visualization system 100, according to some embodiments of this invention. The visualization systems 100 and methods described herein may be implemented in hardware, software (e.g., firmware), or a combination thereof. In some embodiments, the methods described may be implemented, at least in part, in hardware and may be part of the microprocessor of a special or general-purpose computer system 600, such as a personal computer, workstation, minicomputer, or mainframe computer. For example, and not by way of limitation, the visualization system 100 may be implemented as a hardware circuit or a software module or application, or a combination of these, which may be run on, or be installed on, a computer system 600 such as described herein.

In some embodiments, as shown in FIG. 6, the computer system 600 includes a processor 605, memory 610 coupled to a memory controller 615, and one or more input devices 645 and/or output devices 640, such as peripherals, that are communicatively coupled via a local I/O controller 635. These devices 640 and 645 may include, for example, a printer, a scanner, a microphone, and the like. Input devices such as a conventional keyboard 650 and mouse 655 may be coupled to the I/O controller 635. The I/O controller 635 may be, for example, one or more buses or other wired or wireless connections, as are known in the art. The I/O controller 635 may have additional elements, which are omitted for simplicity, such as controllers, buffers (caches), drivers, repeaters, and receivers, to enable communications.

The I/O devices 640, 645 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 605 is a hardware device for executing hardware instructions or software, particularly those stored in memory 610. The processor 605 may be a custom made or commercially available processor, a central processing unit (CPU), an auxiliary processor among several processors associated with the computer system 600, a semiconductor-based microprocessor (in the form of a microchip or chip set), a macroprocessor, or other device for executing instructions. The processor 605 includes a cache 670, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 670 may be organized as a hierarchy of more cache levels (L1, L2, etc.).

The memory 610 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, or other types of storage media. Note that the memory 610 may have a distributed architecture, where various components are situated remote from one another but may be accessed by the processor 605.

The instructions in memory 610 may include one or more separate programs, each of which comprises an ordered listing of executable instructions for implementing logical functions. In the example of FIG. 6, the instructions in the memory 610 include a suitable operating system (OS) 611. The operating system 611 essentially may control the execution of other computer programs and provides scheduling, input-output control, file and data management, memory management, and communication control and related services.

Additional data, including, for example, instructions for the processor 605 or other retrievable information, may be stored in storage 620, which may be a storage device such as a hard disk drive or solid-state drive. The stored instructions in memory 610 or in storage 620 may include those enabling the processor to execute one or more aspects of the visualization systems 100 and methods of this disclosure.

The computer system 600 may further include a display controller 625 coupled to a display 630. In some embodiments, the computer system 600 may further include a network interface 660 for coupling to a network 665. The network 665 may be an IP-based network for communication between the computer system 600 and an external server, client and the like via a broadband connection. The network 665 transmits and receives data between the computer system 600 and external systems. In some embodiments, the network 665 may be a managed IP network administered by a service provider. The network 665 may be implemented in a wireless fashion, e.g., using wireless protocols and technologies, such as WiFi, WiMax, etc. The network 665 may also be a packet-switched network such as a local area network, wide area network, metropolitan area network, the Internet, or other similar type of network environment. The network 665 may be a fixed wireless network, a wireless local area network (LAN), a wireless wide area network (WAN) a personal area network (PAN), a virtual private network (VPN), intranet or other suitable network system and may include equipment for receiving and transmitting signals.

Visualization systems 100 and methods according to this disclosure may be embodied, in whole or in part, in computer program products or in computer systems 600, such as that illustrated in FIG. 6.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   determining that a first time point in a video has been reached during playback of the video;
   displaying a dynamic relationship graph associated with the first time point and illustrating one or more relationships among two or more characters in the video, responsive to the first time point being reached, wherein the relationship graph comprises:
      two or more nodes comprising a respective node representing each character of the two or more characters in the video; and
      one or more edges comprising a respective edge representing each relationship of the one or more relationships among the two or more characters;
   determining that a second time point is reached in the video; and
   updating the dynamic relationship graph to represent a change in the one or more relationships between the first time point and the second time point,
   wherein the displaying the dynamic relationship graph associated with the first time point and illustrating the one or more relationships among the two or more characters in the video, responsive to the first time point being reached, comprises generating the dynamic relationship graph on demand responsive to the first time point being reached.

2. The computer-implemented method of claim 1, further comprising assigning a respective description to each edge of the one or more edges, wherein the respective description of an edge describes the relationship represented by the edge.

3. The computer-implemented method of claim 2, wherein the displaying the dynamic relationship graph comprises:

assigning a color to each edge, of the one or more edges, based on a respective sentimentality of the relationship represented by the edge; and displaying each edge in the respective color assigned to the edge.

4. The computer-implemented method of claim 2, wherein the displaying the dynamic relationship graph comprises:

assigning a weight to each edge, of the one or more edges, based on a respective weight of the relationship represented by the edge; and displaying each edge with a respective thickness based on the respective weight assigned to the edge.

5. The computer-implemented method of claim 1, further comprising generating a relationship curve based on the first time point, wherein the relationship curve indicates a dynamic sentimentality of a first relationship of the one or more relationships over a timeframe ending at the first time point.

6. The computer-implemented method of claim 1, further comprising generating an emotion curve based on the first time point, wherein the emotion curve indicates a dynamic mood of a first character of the two or more characters over a timeframe ending at the first time point.

7. A system comprising:

a memory having computer-readable instructions; and one or more processors for executing the computer-readable instructions to perform:

determining that a first time point in a video has been reached during playback of the video;

displaying a dynamic relationship graph associated with the first time point and illustrating one or more relationships among two or more characters in the video, responsive to the first time point being reached, wherein the relationship graph comprises:

two or more nodes comprising a respective node representing each character of the two or more characters in the video; and one or more edges comprising a respective edge representing each relationship of the one or more relationships among the two or more characters;

determining that a second time point is reached in the video; and updating the dynamic relationship graph to represent a change in the one or more relationships between the first time point and the second time point, wherein the displaying the dynamic relationship graph associated with the first time point and illustrating the one or more relationships among the two or more characters in the video, responsive to the first time point being reached, comprises generating the dynamic relationship graph on demand responsive to the first time point being reached.

8. The system of claim 7, wherein the one or more processors execute the computer-readable instructions to further perform:

assigning a respective description to each edge of the one or more edges;

wherein the respective description of an edge describes the relationship represented by the edge.

9. The system of claim 8, wherein the displaying the dynamic relationship graph comprises:

assigning a color to each edge, of the one or more edges, based on a respective sentimentality of the relationship represented by the edge; and displaying each edge in the respective color assigned to the edge.

10. The system of claim 8, wherein the displaying the dynamic relationship graph comprises:

assigning a weight to each edge, of the one or more edges, based on a respective weight of the relationship represented by the edge; and displaying each edge with a respective thickness based on the respective weight assigned to the edge.

11. The system of claim 7, wherein the one or more processors execute the computer-readable instructions to further perform:

generating a relationship curve based on the first time point;

wherein the relationship curve indicates a dynamic sentimentality of a first relationship of the one or more relationships over a timeframe ending at the first time point.

12. The system of claim 7, wherein the one or more processors execute the computer-readable instructions to further perform:

generating an emotion curve based on the first time point;

wherein the emotion curve indicates a dynamic mood of a first character of the two or more characters over a timeframe ending at the first time point.

13. A computer-program product for visualizing a relationship depicted in a video, the computer-program product comprising a computer-readable storage medium having program instructions embodied therewith, the program instructions executable by a processor to cause the processor to perform a method comprising:

determining that a first time point in a video has been reached during playback of the video;

displaying a dynamic relationship graph associated with the first time point and illustrating one or more relationships among two or more characters in the video, responsive to the first time point being reached, wherein the relationship graph comprises:

two or more nodes comprising a respective node representing each character of the two or more characters in the video; and one or more edges comprising a respective edge representing each relationship of the one or more relationships among the two or more characters;

determining that a second time point is reached in the video; and updating the dynamic relationship graph to represent a change in the one or more relationships between the first time point and the second time point.

14. The computer-program product of claim 13, the method performed by the processor further comprising assigning a respective description to each edge of the one or more edges, wherein the respective description of an edge describes the relationship represented by the edge.

15. The computer-program product of claim 14, wherein the displaying the dynamic relationship graph comprises:

assigning a color to each edge, of the one or more edges, based on a respective sentimentality of the relationship represented by the edge; and displaying each edge in the respective color assigned to the edge.

16. The computer-program product of claim 14, wherein the displaying the dynamic relationship graph comprises:

assigning a weight to each edge, of the one or more edges, based on a respective weight of the relationship represented by the edge; and displaying each edge with a respective thickness based on the respective weight assigned to the edge.

17. The computer-program product of claim 13, the method performed by the processor further comprising generating a relationship curve based on the first time point, wherein the relationship curve indicates a dynamic sentimentality of a first relationship of the one or more relationships over a timeframe ending at the first time point.

18. The computer-program product of claim 13, the method performed by the processor further comprising generating an emotion curve based on the first time point, wherein the emotion curve indicates a dynamic mood of a first character of the two or more characters over a timeframe ending at the first time point.

\* \* \* \* \*